W. J. FENDER.
DUST COLLECTOR.
APPLICATION FILED MAR. 29, 1917.
1,265,763.
Patented May 14, 1918.
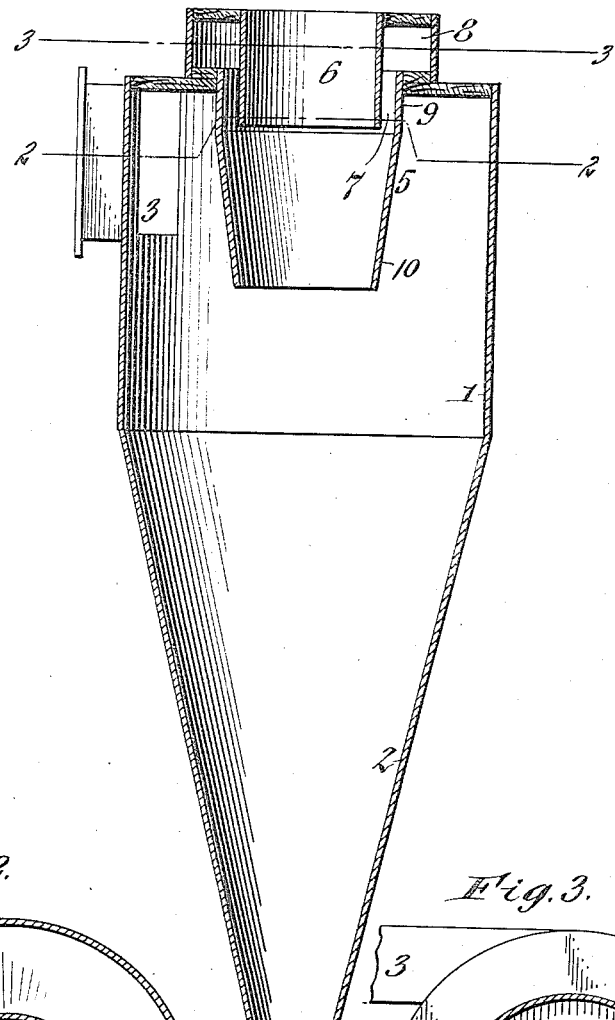
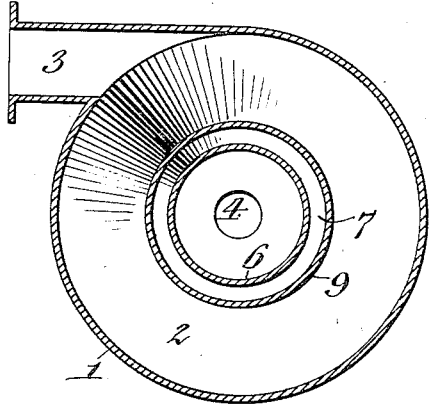
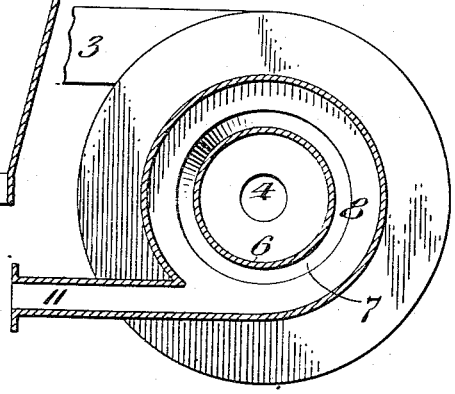
Inventor
William J. Fender
by Leiper & Popp
Attorneys.

UNITED STATES PATENT OFFICE.

WILLIAM J. FENDER, OF SILVER CREEK, NEW YORK.

DUST-COLLECTOR.

1,265,763.      Specification of Letters Patent.      Patented May 14, 1918.

Application filed March 29, 1917. Serial No. 158,390.

*To all whom it may concern:*

Be it known that I, WILLIAM J. FENDER, a citizen of the United States, residing at Silver Creek, in the county of Chautauqua and State of New York, have invented new and useful Improvements in Dust-Collectors, of which the following is a specification.

This invention relates to a dust collector of that type in which the dust laden air is delivered tangentially into the large end of a conical separating chamber and the bulk of the dust or heavy material is delivered through an outlet opening at the small end of the separating chamber while the more or less purified air escapes through the large end of said chamber.

It is the object of this invention to provide means whereby the air escaping through the outlet in the large end of the separating chamber is freed from substantially all of the dust particles which may be contained therein and thus render such machines more efficient, and to accomplish this purpose in a comparatively simple manner which will not materially increase the cost of the dust collector nor involve any increased cost in its operation.

In the accompanying drawings:

Figure 1 is a vertical section of a dust collector embodying my invention. Figs. 2 and 3 are horizontal sections taken on the correspondingly numbered lines in Fig. 1.

Similar characters of reference indicate corresponding parts throughout the several views.

The main separating chamber of this dust collector preferably comprises an upper cylindrical part 1 and a lower downwardly tapering conical lower part 2 the walls of which are preferably constructed of sheet metal. The dust laden air is delivered by a fan or any other suitable means from the source where it is gathered into the upper part of the main separating chamber through an inlet pipe or passage 3 which opens tangentially into this chamber. As the dust laden air is delivered into the main separating chamber the same whirls circumferentially therein and forms a vortex so that the bulk of the dust or other particles heavier than the air are separated therefrom and discharged through a small outlet opening 4 at the lower or small end of the main separating chamber. The air from which the bulk of the dust has been separated passes from the central part of the upper or large end of the main separating chamber upwardly and outwardly from the machine and during such passage the same is operated upon by my improvements so that when the air finally escapes from the machine the same contains no appreciable dust. In the preferred form of my invention, as shown in the drawings the same is constructed as follows:

5 represents a lower or front outlet tube which is mounted centrally on the top of the main separating chamber and projects downwardly into the central part of the latter to a point preferably below the tangential inlet 3, as shown in Fig. 1. 6 represents an upper or rear outlet tube which has its lower or front part arranged centrally within the lower or front tube and its upper or rear part arranged above the same, the lower end of said upper tube being arranged above the lower end of said lower tube. The upper tube is preferably cylindrical and of smaller diameter than the upper part of the lower tube and is separated from the latter by an intervening annular passage 7 which places the space between the lower ends of the lower and upper tubes in communication with an auxiliary chamber 8 arranged above the top of the main separating chamber and surrounding the upper or rear part of the upper or rear outlet tube. The upper part 9 of the lower or front tube is preferably cylindrical and the lower or front part 10 of the same is contracted so that the same is of the same diameter, or substantially so, as the lower or front end of the upper or rear outlet tube, this contraction being preferably effected by tapering the lower part of the lower outlet tube downwardly so as to avoid the formation of an internal shoulder thereon upon which any dust would be liable to lodge. The auxiliary chamber 8 is provided with an outlet pipe 11 preferably arranged tangentially in a direction opposite to the inlet pipe 3 so that any circumferentially whirling air entering the same will find a free escape from the auxiliary chamber through the outlet thereof.

The air which has been freed from the bulk of the dust passes from the vortex or central part of the main separating chamber in a more or less compressed condition upwardly into the lower outlet tube 5 and then expands within the latter below the upper tube by reason of the gradually upwardly enlarging form of the lower tube, whereby practically all of the dust particles still contained in the air are thrown outwardly against the bore of the lower tube and are carried upwardly through the annular passage 7 into the auxiliary chamber 8. The substantially dust free air now passes from the central part of the lower tube into the upper tube of smaller diameter whereby the air is again compressed before the same can pass outwardly through this upper tube to the outer atmosphere. The dust which is delivered into the auxiliary chamber is withdrawn from the latter through the outlet pipe 11 and re-conducted to the inlet 3 of the main separating chamber or to some other machine for effecting complete separation of the dust from the air, but if desired the dust removed from the auxiliary chamber may be otherwise disposed of.

It will be noted that the operation of rendering the air practically dust free as it passes through the outlet tubes 5, 6 depends upon making the lower ends of these tubes of the same diameter, or substantially so, while the upper part of the lower tube is of larger diameter than the lower part of the upper tube in order to form an expansion space between the lower ends of these tubes in which the air has an opportunity to expand between the time it enters the lower tube in a compressed condition and the time it again leaves the upper tube in a compressed condition. Any particles of dust contained in the air while passing through these tubes are therefore separated therefrom and thrown against the bore of the lower tube by the centrifugal action of the air and this separated dust owing to the constantly upward movement of the air is finally carried through the annular passage 7 into the auxiliary chamber. This secondary separation of the dust from the air after the latter has been operated upon in the main separating chamber results in rendering the air practically free from dust before it leaves the machine and this is accomplished without the use of any complicated or moving parts which would involve material expense in construction or maintenance. This improvement is therefore particularly desirable for flour mills, and elsewhere, in which a large number of such collectors are usually employed for the purpose of not only keeping the mill clean but also to save the more valuable materials which otherwise would be lost in the form of dust.

I claim as my invention:

1. A dust collector comprising a conical separating chamber having a tangential inlet for the dust laden air, an outlet at the small end of the separating chamber, a front outlet tube arranged in the large end of the separating chamber and having a contracted front end, a rear outlet tube arranged within said front tube and separated from the latter by an intervening space, the front ends of said tubes being of the same diameter, and an auxiliary chamber communicating with the space between said tubes.

2. A dust collector comprising a tapering separating chamber provided with a tangential inlet at its large end for the dust laden air, an outlet in its small end for the heaviest dust particles and an outlet in its large upper end for the partly clarified air, and means for effecting a final separation of dust from the air as the same passes through said outlet in the large end of said chamber comprising a front outlet tube projecting into the central part of the large end of said separating chamber, a rear outlet tube arranged in the rear part of said front tube and separated from the latter by an annular passage which communicates at its front end with the space between the front ends of said tubes, the front end of said rear tube being in rear of the front end of said front tube and the front ends of said tubes being of the same diameter, and a chamber communicating with the rear end of said annular passage and provided with an outlet.

3. A dust collector comprising a tapering separating chamber provided with a tangential inlet at its large end for the dust laden air, an outlet in its small end for the heaviest dust particles and an outlet in its large end for the partly clarified air, and means for effecting a final separation of dust from the air as the same passes through said outlet in the large end of said chamber comprising a large front outlet tube projecting axially into the central part of the large end of said chamber and having a cylindrical rear part and a forwardly tapering front part, and a small rear outlet tube which is arranged in the rear part of said front tube and which is of cylindrical form and of smaller diameter than the rear part of said front tube and separated from the latter by an intervening annular passage and having its front end arranged in rear of the front end of said front tube, and a chamber communicating with the rear end of said annular passage and having an outlet.

WILLIAM J. FENDER.